US008328132B2

(12) United States Patent
Marche et al.

(10) Patent No.: US 8,328,132 B2
(45) Date of Patent: Dec. 11, 2012

(54) DAMAGE-TOLERANT ATTACHMENT SYSTEM FOR AN AIRCRAFT ENGINE

(75) Inventors: Herve Marche, Roquettes (FR); Gilles Weyland, Brax (FR)

(73) Assignee: Airbus Operations SAS, Toulouse (FR)

( * ) Notice: Subject to any disclaimer, the term of this patent is extended or adjusted under 35 U.S.C. 154(b) by 1186 days.

(21) Appl. No.: 11/745,032

(22) Filed: May 7, 2007

(65) Prior Publication Data
US 2008/0121754 A1 May 29, 2008

(30) Foreign Application Priority Data

May 9, 2006 (FR) ...................................... 06 04080

(51) Int. Cl.
B64D 27/00 (2006.01)
(52) U.S. Cl. .......... 244/54; 244/53 R; 248/555; 248/557
(58) Field of Classification Search ............... 244/53 R, 244/54; 248/554, 557, 555, 556; 60/797, 60/796
See application file for complete search history.

(56) References Cited

U.S. PATENT DOCUMENTS

| 3,208,217 | A | * | 9/1965 | Sonder | 60/798 |
|---|---|---|---|---|---|
| 4,065,077 | A | * | 12/1977 | Brooks | 244/54 |
| 5,275,357 | A | | 1/1994 | Seelen et al. | |
| 5,620,154 | A | * | 4/1997 | Hey | 244/54 |
| 5,725,181 | A | * | 3/1998 | Hey | 244/54 |
| 5,921,500 | A | * | 7/1999 | Ellis et al. | 244/54 |
| 5,927,644 | A | | 7/1999 | Ellis et al. | |
| 6,059,227 | A | * | 5/2000 | Le Blaye et al. | 244/54 |
| 6,170,780 | B1 | * | 1/2001 | Williams | 244/15 |
| 6,296,203 | B1 | | 10/2001 | Manteiga et al. | |
| 6,398,161 | B1 | * | 6/2002 | Jule et al. | 244/54 |
| 6,494,403 | B2 | * | 12/2002 | Jule et al. | 244/54 |
| 7,007,890 | B2 | * | 3/2006 | Beutin et al. | 244/54 |
| 2002/0104924 | A1 | * | 8/2002 | Roszak | 244/54 |
| 2003/0025033 | A1 | | 2/2003 | Levert et al. | |
| 2005/0067528 | A1 | * | 3/2005 | Loewenstein et al. | 244/54 |
| 2005/0269445 | A1 | * | 12/2005 | Chevalier et al. | 244/54 |
| 2005/0269446 | A1 | * | 12/2005 | Dron | 244/54 |

FOREIGN PATENT DOCUMENTS

| EP | 0311155 | 4/1989 |
|---|---|---|
| EP | 0564126 | 10/1993 |
| EP | 1281615 | 2/2003 |
| GB | 1397068 | 6/1975 |
| WO | 9311041 | 6/1993 |

OTHER PUBLICATIONS

Preliminary Search Report dated Jan. 16, 2007 with English translation.

* cited by examiner

Primary Examiner — Philip J Bonzell
(74) Attorney, Agent, or Firm — Dickinson Wright PLLC

(57) ABSTRACT

A damage-tolerance attachment system for an aircraft engine includes first and second attachment devices attaching the aircraft engine to a pylon fixedly attached to the aircraft, and a third backup attachment device including a first portion attached to the pylon and a second portion attached to the engine, the first and second portions connected together loosely so as not to disrupt an isostasy of the first and second attachment devices.

7 Claims, 4 Drawing Sheets

DAMAGE-TOLERANT ATTACHMENT SYSTEM FOR AN AIRCRAFT ENGINE

FIELD OF THE INVENTION

The present invention relates to a damage-tolerant attachment system for an aircraft engine.

BACKGROUND OF THE RELATED ART

It is known that a system for attaching an engine to an aircraft must not induce unforeseen stresses in said engine, in order to ensure predetermined optimal functioning of the latter. This is why the known attachment systems comprise two attachment devices spaced longitudinally along said engine and capable of attaching said engine in a predetermined isostatic manner to a pylon fixedly attached to the aircraft.

It is also known that such an attachment system must satisfy safety regulations so as to ensure that, in the event of said engine breaking up, the loss of the aircraft does not ensue therefrom.

It may be that an engine attachment system satisfying these regulations when said engine is taken independently can no longer do so when it is placed in the vicinity of another engine, as is the case for example for aircraft supporting, on the back of the rear portion of their fuselage, two parallel engines close to one another: specifically, in this case, each attachment system takes account only of the break-up of the engine that it carries or supports, whereas in reality it must additionally withstand the break-up of the adjacent engine.

SUMMARY OF THE INVENTION

The object of the present invention is to remedy this disadvantage.

Thus according to the invention, the attachment system for an aircraft engine, said system comprising a first and a second attachment devices spaced longitudinally along said engine and capable of attaching said engine to a pylon fixedly attached to said aircraft, is remarkable in that it comprises at least a third backup attachment device, spaced longitudinally relative to said first and second attachment devices and comprising at least a first portion fixedly attached to said pylon and at least a second portion fixedly attached to said engine, said first and second portions being connected together loosely so as not to disrupt the resulting isostasis of said first and second attachment devices.

Therefore, in normal operation, the third attachment device (s) is (are) for backup and does (do) not intervene in the attachment of said engine. On the other hand, when an accident occurs and one or other of said first and second attachment devices is damaged or destroyed, the third device(s) is (are) ready to intervene to supplement the first or second failed attachment device. Certainly, in this case, there is a risk that the attachment is not isostatic, but this is a provisional emergency situation which, in any case, will require subsequent repairs.

The loose connection between the first and second portions of the third attachment device may be deformable or flexible, for example because it is made with the aid of a block of rubber or similar material. However, in an advantageous embodiment, it is preferable that said first and second portions of the third attachment device be connected to one another with clearance. Accordingly, said first and second portions of the third attachment device may be connected to one another by means of at least one shaft fixedly attached to one of said portions and traversing with clearance through an orifice made in the other portion. Naturally, said clearance must be provided so that said third attachment device remains inactive, even in bumpy flight conditions, for example under the action of wind turbulence.

In an advantageous embodiment, said third attachment device comprises a cradle fixedly attached to said pylon and at least two lateral yokes fixedly attached to said engine, each of said yokes supporting a shaft thanks to which it is articulated with clearance on said cradle.

The shafts of said yokes may be parallel with one another and with the longitudinal shaft of said engine.

If said engine is of the turboshaft type comprising, from front to rear, a fan, compressors and a turbine, said three attachment devices may connect said pylon at said fan, said compressors and said turbine.

Said loosely connected third attachment device may, advantageously, be placed between the casing of the fan and said pylon, or between the casing of the compressors and said pylon.

In the attachment system according to the invention, the engine may be suspended from said pylon or, equally, supported by it.

In the latter case, as mentioned above, the attachment system according to the invention applies particularly, although not exclusively, to an aircraft comprising two engines (with propellers or turboshafts) mounted at the rear of said aircraft, on the back of the latter, said engines being placed one beside the other with their shafts parallel.

BRIEF DESCRIPTION OF THE DRAWINGS

The figures of the appended drawing will explain how the invention may be embodied. In these figures, identical reference numbers indicate similar elements.

DETAILED DESCRIPTION OF THE INVENTION

Figure 1:
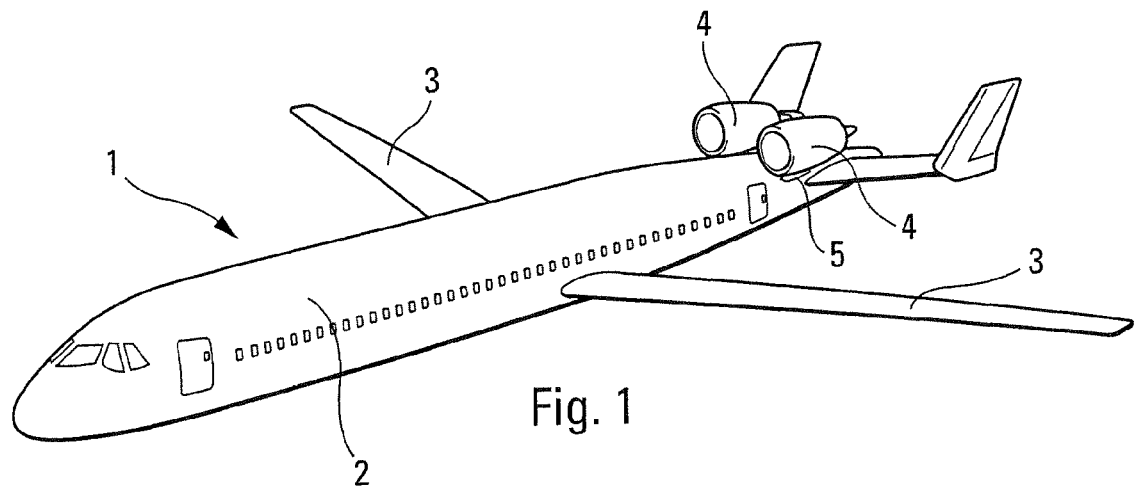
FIG. 1 is a view in perspective, from the side, of an exemplary civil transport aircraft in which the attachment system according to the present invention is particularly useful.
Figure 2:
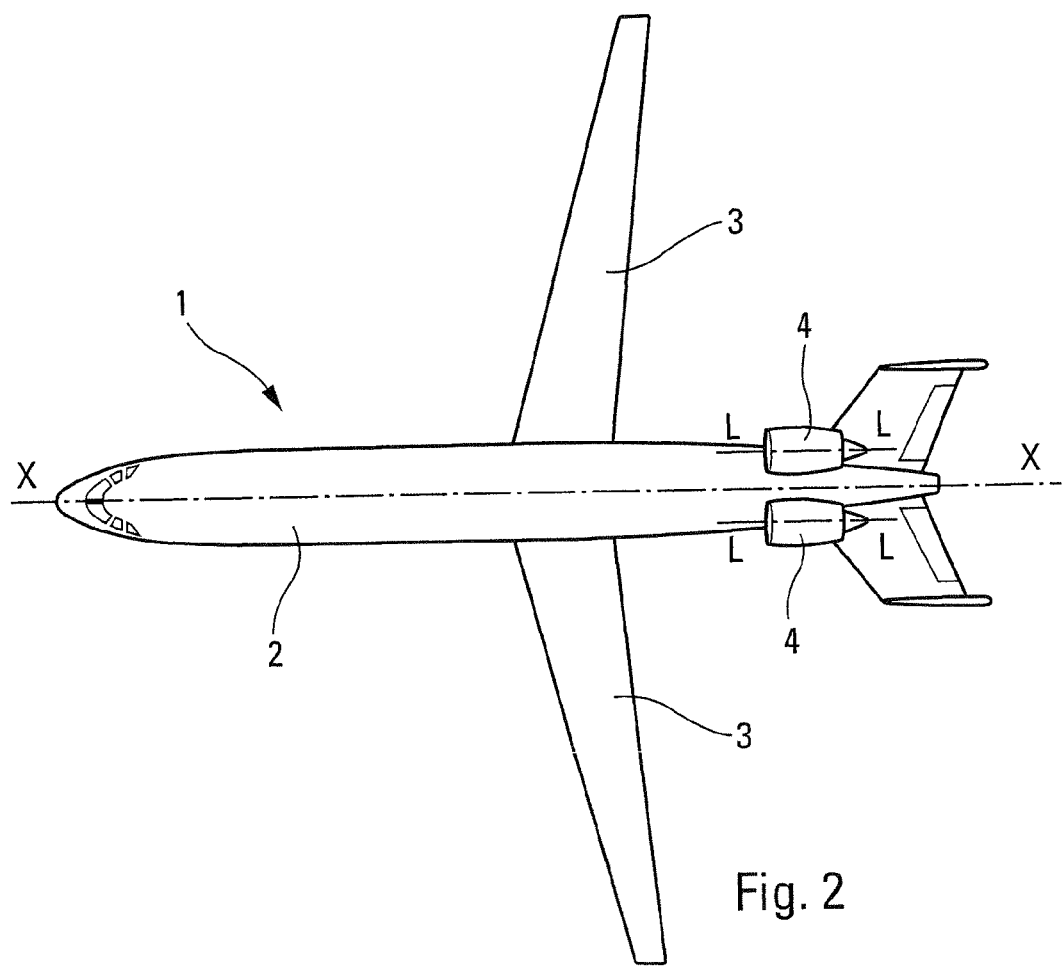
FIG. 2 is a plan view of the aircraft of FIG. 1.

The aircraft 1, shown in FIGS. 1 and 2, has a longitudinal axis X-X that comprises a fuselage 2 and wings 3 placed in symmetry with one another relative to said fuselage.

At the rear, on the back of the fuselage 2, the aircraft 1 comprises two identical turboshaft engines 4, whose axes L-L are parallel with one another and with the longitudinal axis X-X of the aircraft 1. The turboshaft engines 4 are supported by pylons 5 (a small portion of which is visible in FIG. 1).

Figure 3:
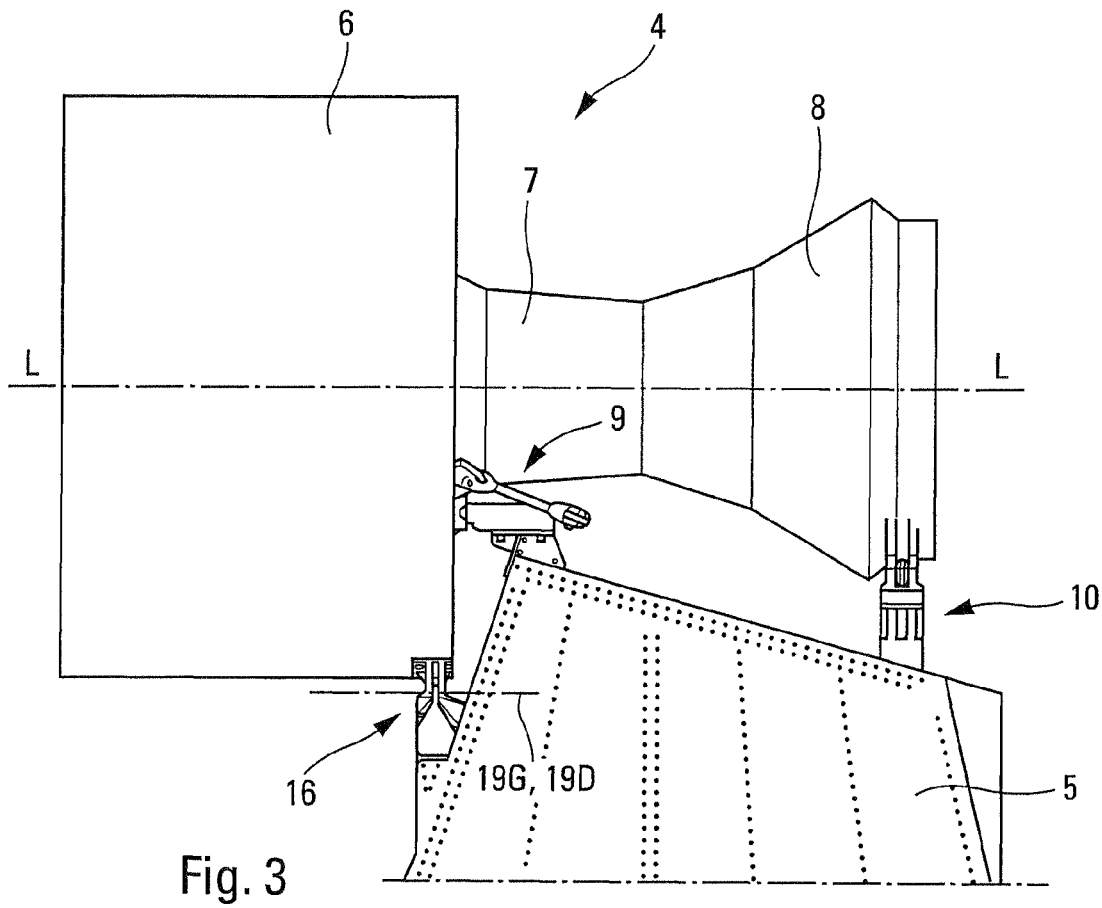
FIG. 3 illustrates schematically the attachment, according to the present invention, of the engines of the aircraft of FIGS. 1 and 2 to pylons of said aircraft.

FIG. 3 shows in greater detail one of the engines 4 and the pylon 5 that supports it. In this figure, the outer cowls of the engine 4 have been eliminated so that, from front to rear, the fan casing 6, the compressor casing 7 and the turbine casing 8 appear.

Each engine 4 is attached isostatically to the corresponding pylon 5 by means of a front attachment device 9 and a rear attachment device 10, interacting respectively with the compressor casing 7 and the turbine casing 8.

Figure 4:
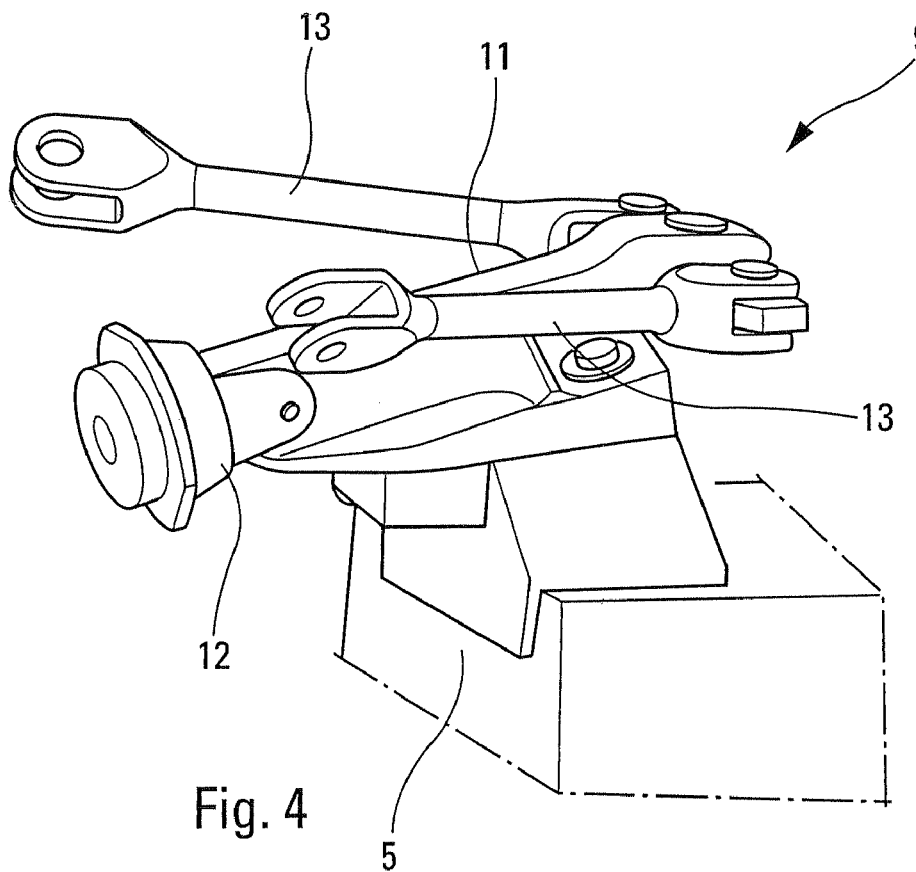
FIGS. 4 and 5 show in perspective examples of two known attachment devices capable of attaching the engine isostatically to the pylon.
Figure 5:
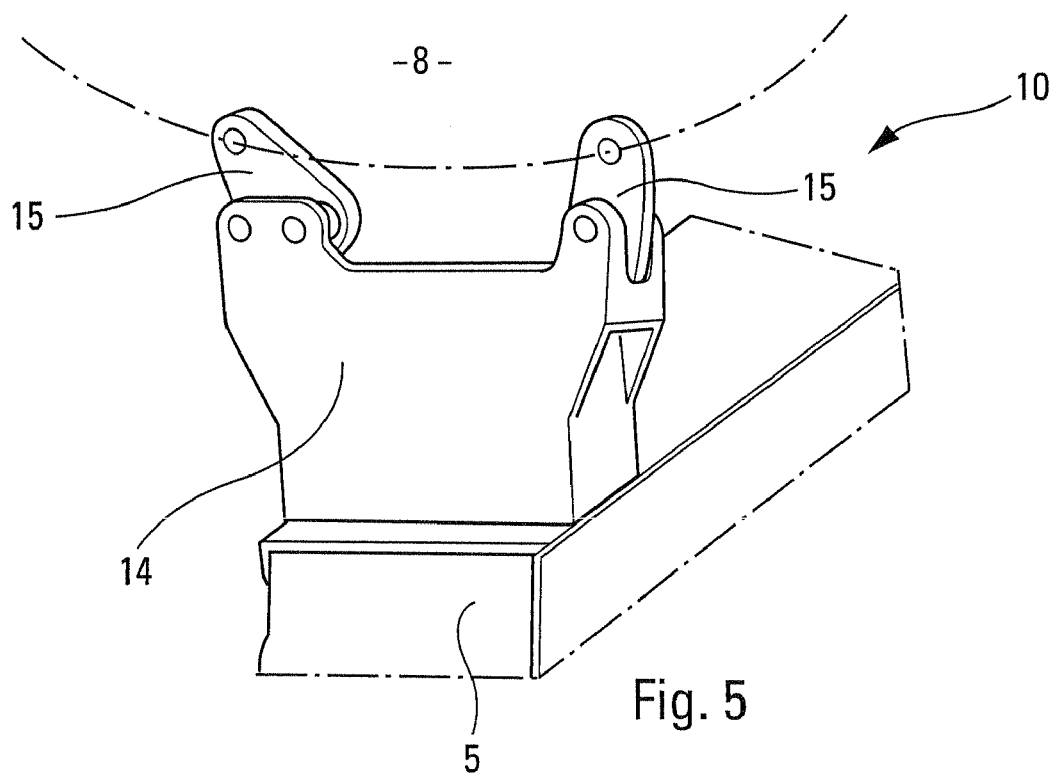

In known exemplary embodiments, shown respectively in FIGS. 4 and 5, the front attachment device 9 may comprise a tie rod 11 provided with an articulated attachment head 12 and two lateral connecting rods 13, while the rear attachment device 10 may comprise a cradle 14 and lateral connecting rods 15.

Figure 6:
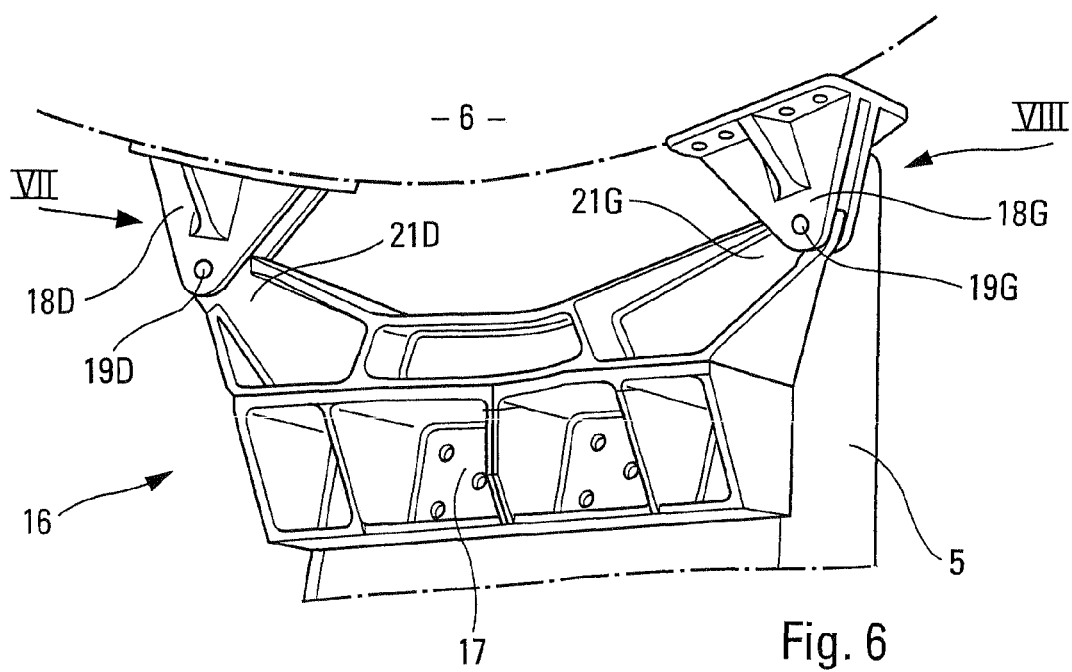
FIG. 6 shows an exemplary embodiment of the loose attachment device according to the present invention.
Figure 7:
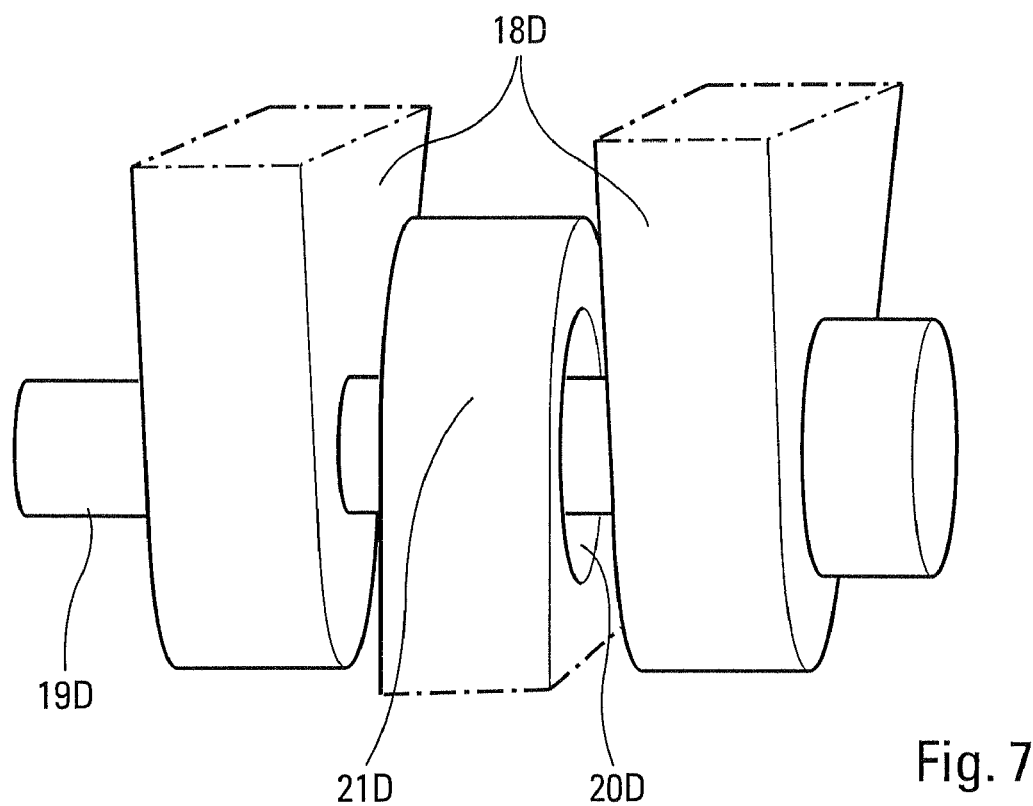
FIGS. 7 and 8 are large-scale partial views along the arrows VII and VIII of the attachment device of FIG. 6.
Figure 8:
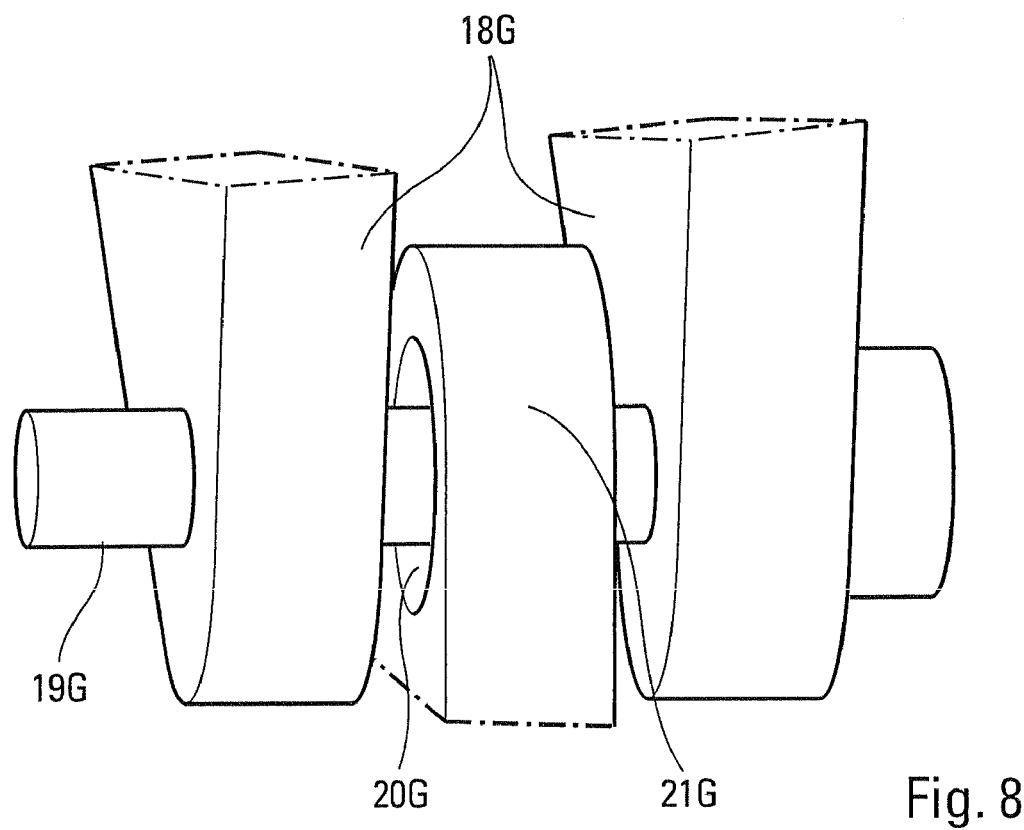

According to the present invention, between the fan casing 6 and the pylon 5 there is also provided a backup attachment device 16 (see FIG. 3) that is therefore spaced longitudinally relative to the attachment devices 9 and 10 and of which an exemplary embodiment is shown in FIGS. 6 to 8.

The attachment device 16 comprises a transverse cradle 17 fixedly attached to the pylon 5 and two yokes 18G and 18D fixedly attached to the fan casing 6. The yokes 18G and 18D are placed laterally relative to the cradle 17 and their articulation shafts 19G and 19D on the latter are parallel with the axis L-L of the engine 4 (see FIG. 3).

As FIGS. 7 and 8 show on a large scale, the articulation shafts 19G and 19D of the yokes 18G and 18D traverse with considerable clearances the orifices 20G, 20D made in the lateral bearing portions 21G, 21D of the cradle 17 interacting with said yokes. These clearances are provided so that, when the attachment devices 9 and 10 operate normally (even in severe flying conditions such as wind turbulence), the attachment device 16 has no action (the shafts 19G and 19D not being in contact with the bearing portions 21G, 21D) and so that, when at least one of the attachment devices 9 and 10 fails, the attachment device 16 helps in attaching the associated engine 4 to the corresponding pylon 5 (the shafts 19G and 19D then being in contact with the bearing portions 21G, 21D).

Although in the drawings and in the above description it has been indicated that the backup attachment device 16 was placed between the fan casing 6 and the pylon 5, this device could occupy another position. For example, the backup attachment device 16 could be placed between the compressor casing 7 and the pylon 5, instead of the front attachment device 9. In this case, the latter could be placed between the fan casing 6 and the pylon 5, instead of said attachment device 16.

The invention claimed is:

1. An attachment system to attach a turboengine to a pylon of an aircraft, said turboengine comprising a fan casing, a compressor casing disposed adjacent to the fan casing, and a turbine casing disposed adjacent to the compressor casing, said attachment system comprising:

first attachment device attached to the pylon and the compressor casing of the turboengine;

second attachment device attached to the pylon and the turbine casing of the turboengine; and a third backup attachment device comprising a first portion fixedly attached to the pylon and a second portion fixedly attached to the fan casing of the turboengine, wherein the first and second portions are configured relative to one another so as not to disrupt a predetermined isostatic attachment of the first and second attachment devices to the pylon, wherein, in response to the first attachment device disengaging from the compressor casing or the pylon, or the second attachment device disengaging from the pylon and the turbine casing, the first portion and the second portion engage with each other, and the third backup attachment is separated from the first attachment device and the second attachment device.

2. The attachment system as claimed in claim 1, wherein said first and second portions of the third backup attachment device are connected to one another with clearance.

3. The attachment system as claimed in claim 2, wherein said first and second portions of the third backup attachment device are connected to one another by at least one shaft fixedly attached to one of said portions and traversing with clearance an orifice made in the other portion.

4. The attachment system as claimed in claim 3, wherein:
the at least one shaft comprises a plurality of shafts;
the first portion of said third backup attachment device comprises a cradle fixedly attached to said pylon; and
the second portion of said third backup attachment device comprises at least two lateral yokes fixedly attached to said turboengine, each of said yokes respectively supporting a corresponding one of the plurality of shafts in such a way as to provide clearance between each of the shafts and said cradle.

5. The attachment system as claimed in claim 4, wherein the shafts of said yokes are parallel with one another and with a longitudinal shaft of said turboengine.

6. An aircraft comprising the attachment system of claim 1.

7. An aircraft comprising two turboengines mounted at a rear of said aircraft, said turboengines being placed one beside the other having respective longitudinal axes which are parallel with a longitudinal axis of the aircraft, wherein each of said turboengines is attached to said aircraft by the attachment system of claim 1.

* * * * *